US007904702B2

(12) United States Patent
Leaback et al.

(10) Patent No.: US 7,904,702 B2
(45) Date of Patent: Mar. 8, 2011

(54) COMPOUND INSTRUCTIONS IN A MULTI-THREADED PROCESSOR

(75) Inventors: Peter Leaback, London (GB); Morrie Berglas, Ontario (CA)

(73) Assignee: Imagination Technologies Limited, Kings Langley, Hertfordshire (GB)

( * ) Notice: Subject to any disclaimer, the term of this patent is extended or adjusted under 35 U.S.C. 154(b) by 393 days.

(21) Appl. No.: 12/228,669

(22) Filed: Aug. 13, 2008

(65) Prior Publication Data

US 2009/0063824 A1 Mar. 5, 2009

(30) Foreign Application Priority Data

Aug. 14, 2007 (GB) .................................. 0715824.9

(51) Int. Cl.
*G06F 9/48* (2006.01)
(52) U.S. Cl. ........................................................ 712/228
(58) Field of Classification Search ........................ None
See application file for complete search history.

(56) References Cited

U.S. PATENT DOCUMENTS

| | | | | |
|---|---|---|---|---|
| 6,212,544 B1 * | 4/2001 | Borkenhagen et al. | ....... | 718/103 |
| 6,256,775 B1 * | 7/2001 | Flynn | ........................... | 717/127 |
| 6,330,661 B1 * | 12/2001 | Torii | ........................... | 712/228 |
| 6,567,839 B1 * | 5/2003 | Borkenhagen et al. | ....... | 718/103 |
| 6,952,825 B1 * | 10/2005 | Cockx et al. | .................. | 718/102 |
| 7,010,674 B2 * | 3/2006 | Tremblay et al. | ............. | 712/228 |
| 7,779,235 B2 * | 8/2010 | Singh et al. | .................... | 712/214 |
| 2002/0083252 A1 * | 6/2002 | Armstrong et al. | ........... | 710/260 |
| 2005/0097552 A1 * | 5/2005 | O'Connor et al. | ............ | 718/100 |
| 2005/0251662 A1 * | 11/2005 | Samra | .......................... | 712/228 |
| 2007/0083274 A1 * | 4/2007 | Krauss | ............................ | 700/4 |
| 2007/0180438 A1 * | 8/2007 | Suba | ............................. | 717/151 |

OTHER PUBLICATIONS

Anderson, T, etal., The Performance Implications of Thread Management Alternatives for Shared-Memory Multiprocessors, 1989, IEEE, IEEE Transactions on Computers vol. 38, No. 12, pp. 1631-1644.*

Agrawal, Anant, Performance Tradeoffs in Multithreaded Processors,1992, IEEE, IEEE Transactions on Parallel and Distributed Systems, vol. 3, No. 5., pp. 525-539.*

* cited by examiner

*Primary Examiner* — Eric Coleman
(74) *Attorney, Agent, or Firm* — Flynn, Theil, Boutell & Tanis, P.C.

(57) ABSTRACT

A multi-threaded processor determines which threads to execute, switches between execution of threads in dependence on the determination, each thread being coupled to a respective register for storing the state of the thread and used in executing instructions on the thread and includes a further register shared by all the threads. The executing threads use the further register to improve execution performance and prevents the switching of execution to another thread while the internal register is in use.

7 Claims, 3 Drawing Sheets

| FIELD | LOCATION | SIZE | DESCRIPTION |
|---|---|---|---|
| opcode | 22:21 | 2 | 00b RET<br>01b MUL<br>10b ADD<br>11b MLA |
| no-resched | 20 | 1 | 0 - permit thread to be re-scheduled after this instruction<br>1 - deny the de-scheduling between this instruction and the next thread |
| dst_bank | 19 | 1 | Destination bank selection:<br>0 - temporary register (R)<br>1 - internal register (I) |
| src0_bank | 18 | 1 | Source bank selection. Only one source argument can select an "internal register" unless each selects the exact same internal register.<br>0 - temporary register (R)<br>1 - internal register (I) |
| src1_bank | 17 | 1 | See src0_bank |
| src2_bank | 16 | 1 | See src0_bank |
| dst_reg | 15:12 | 4 | Register number between 0 and 15. If bank selection is "internal register" this must lie between 0 and 3 |
| src0_reg | 11:8 | 4 | See dst_reg. |
| src1_reg | 7:4 | 4 | See dst_reg. |
| src2_reg | 3:0 | 4 | See dst_reg. |

FIG. 5

COMPOUND INSTRUCTIONS IN A MULTI-THREADED PROCESSOR

FIELD OF THE INVENTION

This invention relates to compound instructions for use in multi-threaded processors and to processors which use such instructions.

BACKGROUND TO THE INVENTION

An example of a multi-threaded processor is described in our U.S. Pat. No. 5,968,167. This discloses a processor which executes each of a plurality of threads in dependence on the availability of resources which each thread requires for it to execute. Selection between threads for execution is performed by a media control core or arbiter which determines which thread should execute and switches between threads as appropriate.

Such a multi-threaded processor will have a separate set of registers which store the program state for each of a number of programs or executing threads. When the resources required by one of the threads is not available e.g. it is waiting for a memory access, then the thread is prevented from continuing and the processor switches to another thread which has all the resources it requires available and is therefore able to continue execution. The arbitration between threads is organised so that the processor is whenever possible executing useful instructions instead of idling and thereby the use of the processor is optimised. When a thread is not executing, the set of registers store its current state.

One factor which is critical in obtaining optimised usage of the processor is the time overhead required to swap execution between threads. If this is similar to the waiting time for particular threads such as waiting for a memory access, then there is no net gain in processor efficiency in switching between executing threads. It has therefore been appreciated that fast swapping between thread execution is required to optimise processor efficiency. Fast thread swapping is helped by having separate sets of registers for the program states stored for each thread.

As discussed above, the state for an executing thread is stored in a set of registers. To get maximum performance from these registers it is common for them to be read at least twice and written to at least once within each clock cycle.

This results from the structure of machine code instructions. An example is an "ADD" instruction. This takes the contents of two source registers, performs a summation on them, and then stores the result back in the register store. In order for this to be executed in one clock cycle, the register storage requires two read ports and one write port, the two read ports to provide the two pieces of data on which the summation is to be performed and the write port to enable the result to be written back to the register. The problem with this is that as the number of ports on a register store is increased, the area of silicon required to produce the store increases significantly and as a result the speed of operation reduces. The cost of the device also increases.

A multi-ported register storage has to increase in depth by the number of threads which require the fast switching ability. For example, if a processor has sixteen registers and it is required that four threads have to switch efficiently then a register storage of four times sixteen is required, sixteen register stores per thread. Therefore, the silicon area required for the register storage is a function of the number of ports and the number of threads.

SUMMARY OF THE INVENTION

In one embodiment a multi threaded processor for executing a plurality of threads in dependence on the availability of resources that each thread requires for it to execute is disclosed. The processor comprises means for determining which thread should execute; means for switching between execution of threads in dependence on the result of the determination, each thread being coupled to a respective register means for storing the state of the thread and for use in executing instructions on the thread; further register means shared by all the threads, wherein executing threads use the further register means to improve execution performance, and, further including means for preventing switching of execution to another thread while the internal register means is in use.

Preferred embodiments of the present invention provide a small register store separate to the main register store for a multi-threaded processor.

This is referred to as the internal register store. The difference between this internal register store and the main register store is that the internal registers are not duplicated for the number of threads, i.e. only a single internal register store is provided which is shared by all the threads. The internal register store can be used by any executing thread.

The internal registers in the internal register store are shared between all the threads and the processor is prevented from switching to execution of another thread while the internal registers are being used. The internal registers provide additional registers which can be used during execution of instructions thereby increasing simultaneous access to data and thereby enabling more functionally rich instructions to be executed. If this number of extra registers and read/write ports were to be added to the main register store they would have to be duplicated for each thread thereby adding considerably to the silicon cost. FIG. 3 shows an example of the compilation of instructions in an embodiment of the invention; FIG. 4 shows the layout of an instruction format for use in an embodiment of the invention and FIG. 5 gives further detail on the format of FIG. 4.

Preferably, an executing thread will group a small number of instructions into a compound instruction. If this compound instruction does not contain any instructions that would halt execution of that thread then there is no loss in CPU efficiency by preventing a switch in the executing thread.

Accordingly, preferred embodiments provide a processor which has more read/write access without the cost of adding more ports to the main register store. The use of compound instructions helps to ensure that processor utilisation is optimised.

BRIEF DESCRIPTION OF THE DRAWINGS

FIG. 5 gives further detail on the format of FIG. 4.

DETAILED DESCRIPTION

Figure 1:
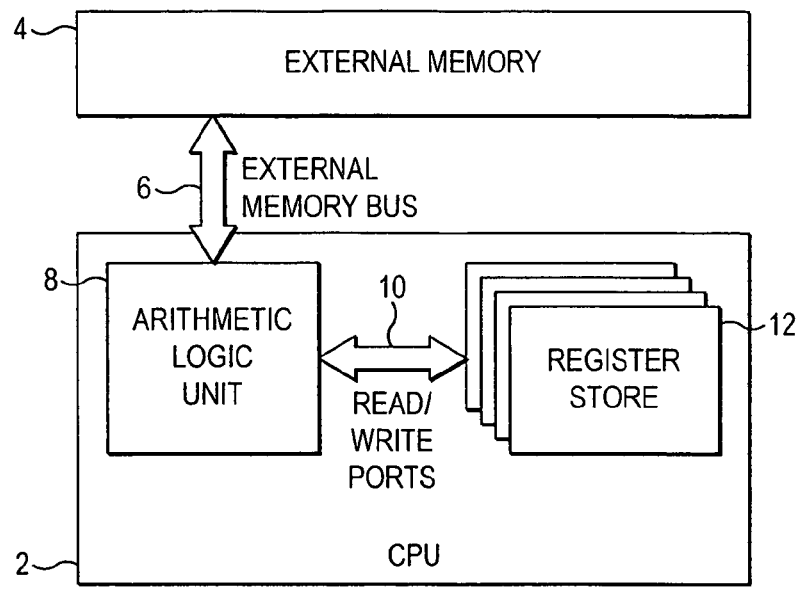
FIG. 1 shows a simplified block diagram of a prior art central processing unit.

In FIG. 1 a central processing unit (CPU) 2 is shown. This is coupled to an external memory 4 by a memory bus 6. This bus 6 is used for transferring data and instructions to and from external memory.

The processing performed by the CPU 2 takes place in an arithmetic logic unit (ALU) 8. R is this which sends memory and instruction requests via the external memory bus 6 to the external memory 4 and which receives responses via the external memory bus 6.

The ALU has a set of read/write ports 10 which are coupled to register stores 12. In this example there are four register stores 12. This enables the CPU 2 to be used to process four threads of instructions and to switch between those as appropriate, retrieving the status of each thread from the appropriate register store 12.

Figure 2:
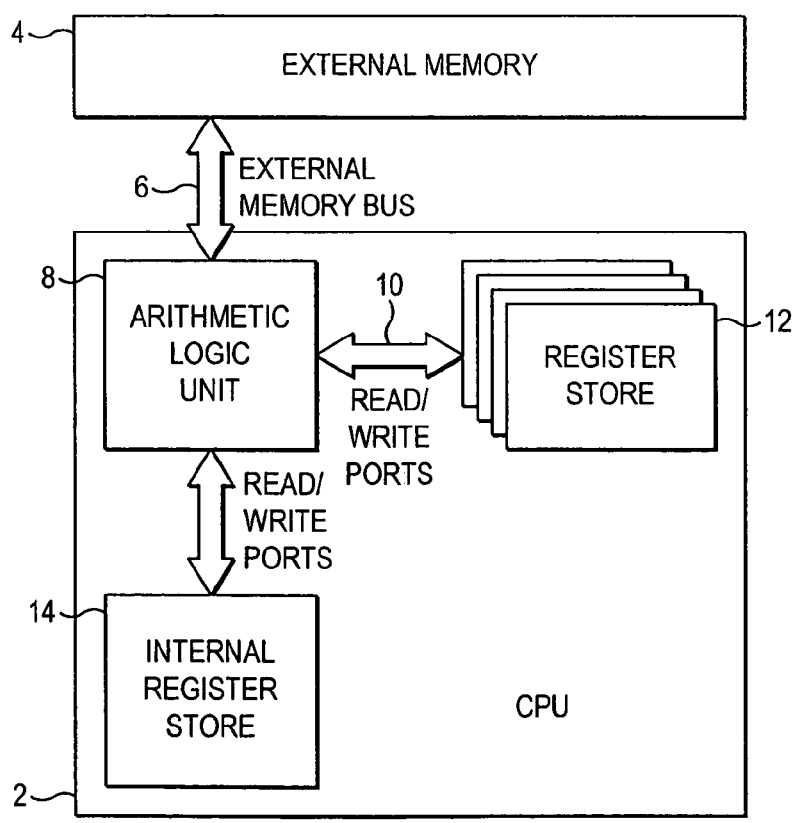
FIG. 2 shows a block diagram of a processor embodiment of the invention.

FIG. 2 shows the arrangement of FIG. 1 modified by the addition of an internal register store 14 coupled to the ALU 8 by a further set of read/write ports 16.

This set of read/write ports is separate to the read/write ports coupling the ALU 8 to the register store 12. There is, however, a single copy of the internal register store 14 which can be used by any thread executing on the ALU 8. For the purposes of this example, we will assume that there will be two read ports and one write port for the register store 12. Other numbers of read ports and write ports into the register store 12 can be provided. In addition, there are two read ports and one write port into the internal register store 14. Different numbers of read and write ports can be provided if different operating performance of the CPU 2 is required.

The operation of the CPU with the internal register store 14 is now described in relation to a common mathematical operation which CPUs have to perform, namely a vector dot product. A three dimensional version of this operation is shown in the equation below:

$$DotProduct = Ax*Bx + Ay*By + Az*Bz$$

In order to perform this equation, three multiplications and two additions are required. The ALU 8 is provided with a single cycle multiply and addition logic. Therefore, it should be possible to execute the dot product shown in the above equation in three cycles. This is illustrated with reference to the theoretical machine instructions below:

MUL R6,RO,R1
MLA R6,R2,R3,R6
MLA R6,R4,R5,R6

'MUL R6,R0,R1' mean multiply the contents of register RO with the contents of register R1, and store the result in register R6. Register RO would contain 'Ax' and register R1 would contain 'Bx'.

'MLA R6,R2,R3,R6' mean multiply the contents of register R2 with the contents of register R3, and add the result to register R6. The result of the summation is stored back in register R6. Register R2 would contain 'Ay' and register R3 would contain 'By'.

'MLA R6,R4,R5,R6' mean multiply the contents of register R4 with the contents of register R5, and add the result to register R6. The result of the summation is stored back in register R6. Register R4 would contain 'AZ' and register R5 would contain Bz'.

From this it can be seen that for the 'MLA' instruction it is necessary to read from three registers and to write to one register. This therefore requires one more read port than has been specified for the register store 12. Therefore, if only the register store 12 were available, there would be insufficient read point ports to enable the operations to perform in three cycles. This problem can be overcome by using the internal register store 14 which has additional read/write ports available to it. As a result, the machine instructions for executing this using the internal register store are as follows:

MUL IO,RO,R1
MLA IO,R2,R3,I0
MLA R6,R4,R5,I0

This differs from the original example in that the intermediate results of the dot product are not stored in register store R6 but instead are stored in the internal register store 10. Only after final accumulation is the result stored back into R6. Using this arrangement ensures that only two read ports and one write port are required for the register store 12, this being the limit for this particular example of a CPU 2.

As can be seen, the internal register 10 is used in place of the external registers thereby reducing the number of memory accesses and producing the total number of lines of code which have to be executed by the CPU.

Whilst the internal register store 14 is in use in execution of the above machine instructions, it is imperative that the CPU is prevented from swapping to execute a different thread. This is because another thread could require the internal register store and would overwrite and corrupt results already written to it. Therefore, preferred embodiments of the invention are arranged to prevent thread swapping using a single bit of the instruction called the no-reschedule bit. When this bit is set on an instruction, the CPU is prevented from swapping threads between the end of that instruction and the next. Therefore, in this example the no-reschedule bit is set on the first two instructions of the dot product, MUL, and the first occurrence of MLA. It is not set on the second occurrence of MLA but the CPU is prevented from swapping to a different thread until after execution of the second occurrence of MLA.

A compound instruction is created by setting the no-reschedule bit on a number of contiguous instructions. When this set of contiguous instructions or compound instruction execute, on a cycle by cycle basis, access to more data paths are available through the read/write ports of the internal register store than would otherwise be available if only the register store 12 were being accessed. This gives significant advantages over the standard processor architecture. To achieve the same performance using standard architecture would require the addition of a third read port to each of the four copies of the register store 12. This would be significantly more costly than the silicon area required for the internal register store.

Compound instructions are a concept which exists within the context of the compiler/assembler which is used to supply instructions that that are read from memory and executed by the CPU. The CPU does not distinguish between ordinary and compound instructions. Similarly, the compiler/assembler will not receive any input program which contains compound instructions.

The additional functionality performed by the compiler/assembler is to analyse the input program and locate positions where compound instructions can be used to increase the performance of the program when it executes on the CPU. Once such a position is found, the compiler/assembler can create a series of CPU instructions which utilise internal registers and set no-reschedule flags to prevent execution of that thread being halted until the internal registers are no longer in use.

A compound instruction can be as simple as two sequential CPU instructions, or as complex as several dozen CPU instructions. When a compound instruction is encountered by the CPU, as long as the no-reschedule flag is set, the execution of a compound instruction persists.

Figure 3:
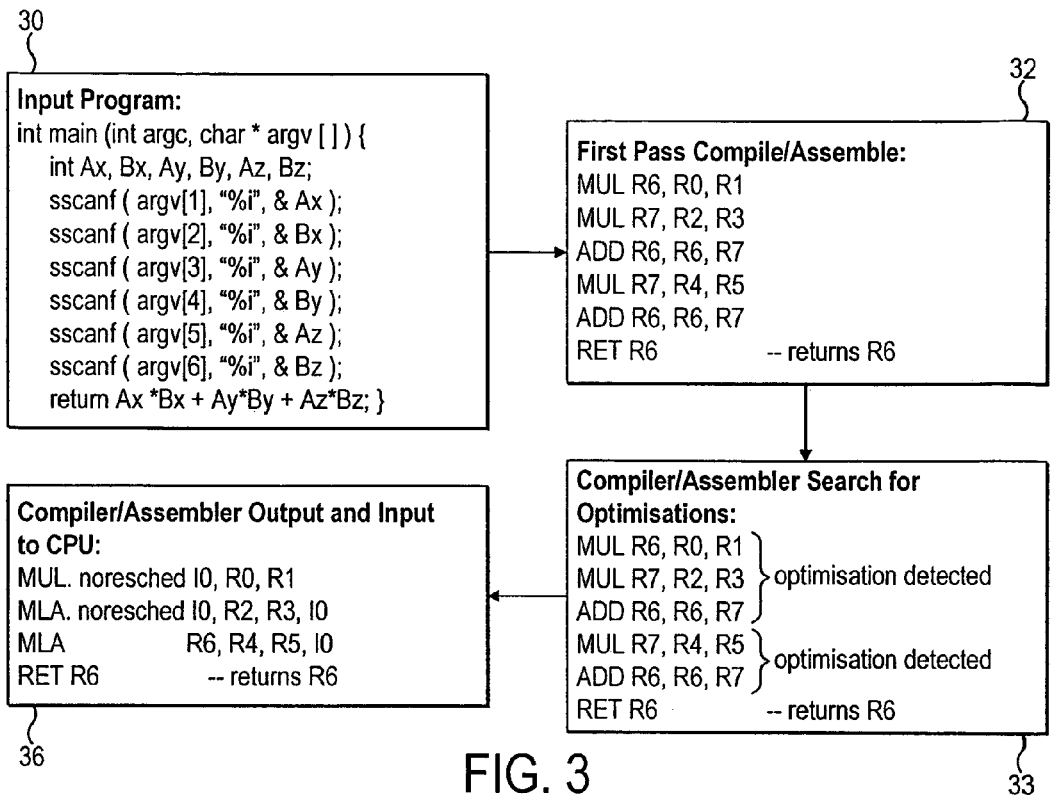
FIG. 3 shows an example of the compilation of instructions in an embodiment of the invention.

The compiler/assembler can operate in two main ways to determine whether or not there are any compound instructions which could be used. The first of these involves compiling the input program then searching for situations where internal registers can be used to reduce the number of instructions to execute and subsequently changing the compiled instructions to use the internal register. The second of these involves the compiler/assembler analysing the input program to identify constructs which are suitable for using internal register system. An example of the first is shown in FIG. 3. In this, an input program is received at 30 and after a first pass is compiled/assembled at 32. At 33 the compiler/assembler searches for optimisations within the compiled/assembled program. In this, it detects the two multiplications and the addition and the further multiplication and addition with the result being stored in register R6. At 36 the compiler/assembler output to the CPU includes instructions with no-reschedule bits set. As can be seen, the first two multiplications and addition are 34 in FIG. 3 are performed in the first two lines of the compound instructions of 36. The subsequent multiplication and addition of 34 is then performed in the third line of the compound instruction.

The CPU itself does not decide to use internal registers or to disable thread scheduling. Instead, the compiler/assembler program detects situations where it can make use of the internal register resources provided by the CPU. The instructions set of the CPU provides mechanisms for the assembler to indicate that it has chosen to use internal registers and also to disable thread rescheduling.

Figure 4:
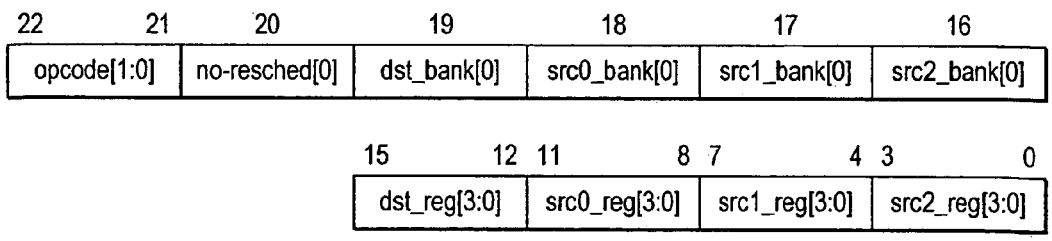
FIG. 4 shows the layout of an instruction format for use in an embodiment of the invention.

In FIG. 4 an instructions set format is shown which can be compiled by a suitable compiler/assembler to support the use of internal registers and also to provide a no-reschedule flag. The data provided in each portion of the instruction format is given in FIG. 5. As can be seen, the no reschedule bit is at bit 20.

In order to set up compound instructions compiler/assemblers are designed to identify when these instructions may be used. This can be implemented when producing the compiler/assembler. For example, if we consider a processor which supports a typical set of instructions, data path instructions provided will include functions such as add, multiply, and multiply-accumulate. The instructions which can be provided from the set are completely constrained by the number of source and destination arguments the hardware implementation of the processor can support. If the processor only supports two source arguments then the processor will not have a multiply-accumulate instruction since that would require three source arguments to be implemented. These constraints are enforced by decisions made when designing the hardware of a processor since this is what determines the instruction set. For example, someone designing a processor with only two read ports to the register file would not put multiply-accumulate support into the arithmetic logic unit.

Embodiments of the present invention increase the number of source and destination arguments for a typical processor (usually for short durations and with some restrictions). This enables additional instructions/operations to be performed which take advantage of the increased input/output data boundary. The processor itself is designed to support some instructions which use the additional arguments, but clearly it cannot anticipate every possible instruction which could use them.

Certain instructions in a set may be hardware processor support instructions which use the extra arguments as implicitly included in its instruction set, and these which will be known by those who design programs to be implemented on the processor. A compiler/assembler takes a user's input and maps it onto the instructions set. Therefore, a compiler/assembler is designed to understand the operation behind all the instructions. This mapping can, for example, be directly implied by the users input into the compiler/assembler so that such instructions are used. Another example of the compiler/assembler examines the instructions and where appropriate maps instructions provided by the user onto compound instructions.

If we consider the first example above, this could be a hardware implementation which supports a filter instruction. The filter instruction can read in filter data and co-efficients from five source arguments in parallel and can filter the data down to a single scalar output. This can then be used for video decode algorithm. The video decoder is written in assembly language and will use the filter instruction directly. Assembly will convert this into machine code understood by the hardware. Thus, if the internal register is present, advantage will be taken of this and compound instructions used.

In the second example above, if the user intent conveyed to the compiler is to first multiply two values and store the result in a third location followed by a multiplication of two different values and store into another new location. The compiler is arranged to identify these sequential operations and to convert them into a single dual multiply operation which reads in the four values in parallel performs the multiplications and returns the results, again, using the additional internal register store, to improve performance.

It will therefore be appreciated that the use of an internal register store significantly improves the performance of multi-threaded processors and enables better performance to be obtained from creating compound instructions during execution of which thread swapping cannot take place. This gives further improvements in performance and ensures that there is no corruption of data as a result of thread swapping.

The invention claimed is:

1. A multi threaded processor for executing a plurality of threads in dependence on the availability of resources that each thread requires for it to execute comprising;
    means for determining which thread should execute;
    means for switching between execution of threads in dependence on the result of the determination,
    each thread being coupled to a respective register means for storing the state of the thread and for use in executing instructions on the thread;
    further register means shared by all the threads, wherein executing threads use the further register means to improve execution performance;
    means for preventing switching of execution to another thread while the internal register means is in use; and
    means to detect a no-reschedule bit in an instruction and wherein the means to prevent switching execution to another thread is operative in response to detection of a no-reschedule bit.

2. A multi threaded processor according to claim 1 in which a compound instruction comprising a sequence of instructions utilises the further register means in its execution and the means for preventing switching execution to another thread is operative in response to such a sequence of instructions until the sequence has finished execution.

3. A multi threaded processor according to claim 2 in which use of the further register means ceases before the sequence of instructions has finished execution.

4. A multi threaded processor according to claim 2 in which a no-reschedule bit is set on each instruction in the sequence and the means for preventing switching of execution to another thread is operative in response to detection of a no-reschedule bit in an instructions.

5. A method for compiling/assembling a thread of instructions for execution on a multi threaded processor, the processor including register means for storing the state of each thread and having further register means which may be used by all threads, the method comprising the steps of, determining which instructions in a thread may utilize the further register means to improve execution performance; and, setting a no-reschedule bit in the executing thread when instructions which utilize the internal register means are to be executed.

6. A method according to claim 5 in which the step of determining which instructions in a thread may utilize the further register means comprises compiling an input program, searching for situations where the further register means can be used to reduce the number of instructions required and including instructions which include no-reschedule bits when the further register is to be used.

7. A method according to claim 5 in which the step of determining which instructions in a thread may utilize the further register means comprises the step of analyzing an input program for instructions which are suitable for execution using the further register means and compiling instructions which utilize the further register means and include no-reschedule bits when such constructs are found.

* * * * *